United States Patent
Lee et al.

(10) Patent No.: US 9,415,359 B2
(45) Date of Patent: Aug. 16, 2016

(54) ELECTRIC APPLIANCE WITH DUAL SPEED OUTPUT

(75) Inventors: Kwok Kay Lee, Hong Kong (CN); Bo Gao, Hong Kong (CN)

(73) Assignee: MAIN POWER ELECTRICAL FACTORY LTD., Kwun Tong, Kowloon (HK)

( * ) Notice: Subject to any disclaimer, the term of this patent is extended or adjusted under 35 U.S.C. 154(b) by 1195 days.

(21) Appl. No.: 12/834,997

(22) Filed: Jul. 13, 2010

(65) Prior Publication Data

US 2012/0014207 A1    Jan. 19, 2012

(51) Int. Cl.
*B01F 13/00* (2006.01)
*B01F 15/00* (2006.01)
*B01F 7/16* (2006.01)
*A47J 43/08* (2006.01)
*B01F 7/00* (2006.01)
*B01F 13/04* (2006.01)
*A47J 43/044* (2006.01)

(52) U.S. Cl.
CPC ............ *B01F 7/1665* (2013.01); *A47J 43/082* (2013.01); *B01F 7/00408* (2013.01); *B01F 7/00583* (2013.01); *B01F 7/00725* (2013.01); *B01F 7/00975* (2013.01); *B01F 13/002* (2013.01); *B01F 13/047* (2013.01); *B01F 15/0048* (2013.01); *A47J 2043/04418* (2013.01); *B01F 2215/0026* (2013.01)

(58) Field of Classification Search
CPC ....... A47J 44/02; A47J 43/04; A47J 43/0449; A47J 43/082; B01F 15/00467; B01F 15/00435; B01F 15/00461
USPC ............ 366/129, 206, 343, 344, 601; 74/745, 74/664 F
See application file for complete search history.

(56) References Cited

U.S. PATENT DOCUMENTS

| 1,767,346 | A | * | 6/1930 | Christiansen | 366/296 |
| 4,176,971 | A | * | 12/1979 | Ernster et al. | 366/298 |
| 2007/0133342 | A1 | * | 6/2007 | Gili et al. | 366/129 |
| 2009/0091199 | A1 | * | 4/2009 | Lee | 310/50 |

* cited by examiner

*Primary Examiner* — Tony G Soohoo
*Assistant Examiner* — Anshu Bhatia
(74) *Attorney, Agent, or Firm* — Leydig, Voit & Mayer, Ltd.

(57) ABSTRACT

An electric appliance has first and second rotational output spindles located within a housing. The first and second spindles have respective first and second couplings for attachment of first and second work tools to the first and second spindles, respectively. The second rotational output spindle is concentric with the first rotational output spindle such that connection of one of the first and second work tools to the corresponding spindle excludes connection of the other of the first and second work tools to the corresponding spindle. The first rotational output spindle has a first rotational speed that is different from a second rotational speed of the second output spindle.

5 Claims, 4 Drawing Sheets

ELECTRIC APPLIANCE WITH DUAL SPEED OUTPUT

BACKGROUND TO THE INVENTION

1. Field of the Invention

The current invention relates to electric appliances with dual speed outputs, and in particular to handheld electric mixers and more particularly to dual speed electric mixers.

2. Background Information

Handheld electric mixers consist of a housing with an uppermost handle and a pair of downwardly extending rotational output spindles that removeably receive work pieces for mixing, beating, blending and or whipping food items or recipe constituents. The spindles are driven by a variable speed motor located in the housing via a reduction gearbox. The electronic variable speed control can be a continuous type, in more expensive mixers, or a stepped speed control, comprising typically 3 stepped speeds, in less expensive mixers. Both speed control methods vary voltage to control the motor speed. Less expensive universal motors often used in such mixers might have a narrow speed torque range and so exhibit poor voltage speed control over the full speed range of the motor. This limits versatility of the mixer which ideally should be able to achieve very low mixer speeds for preparation of delicate food items or recipe constituents through to very high mixing speeds for thoroughly mixing, blending, beating, whipping or otherwise food items or recipe constituents.

SUMMARY OF THE INVENTION

It is an object of the present invention to provide a variable speed hand mixer which overcomes or substantially ameliorates the above problem, or at least provides the public with a useful alternative.

According to the invention there is provided an electric appliance has first and second rotational output spindles located with a housing. The first and second spindles have respective first and second couplings for attachment of first and second work tools. The second rotational output spindle is concentric with the first rotational output spindle such that connection of one of the work tools to its respective spindle excludes connection of the other one of the work tools to its respective spindle. The first rotational output spindle has a first rotational speed that is different to a second rotational speed of the second output spindle. The first rotational speed is three or more times the second rotational speed.

The mixer has only a single motor and the first and second rotational output spindles are driven at the same time from the motor. The first rotational output spindle has a gear driven directly from an output of the motor. The appliance includes a stub-shaft located parallel to the first and second spindles. The stub-shaft is driven from the first spindle by a first pair of gears, and the stub shaft drives the second spindle via a second pair of gears. The first and second pairs of gears are chosen such that the first rotational speed is three or more times the second rotational speed.

Preferably, the electric appliance is a handheld electric mixer, the first work tool is a mixer or beater and the second work tools is a dough hook or kneader.

Further aspects of the invention will become apparent from the following description.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 1:
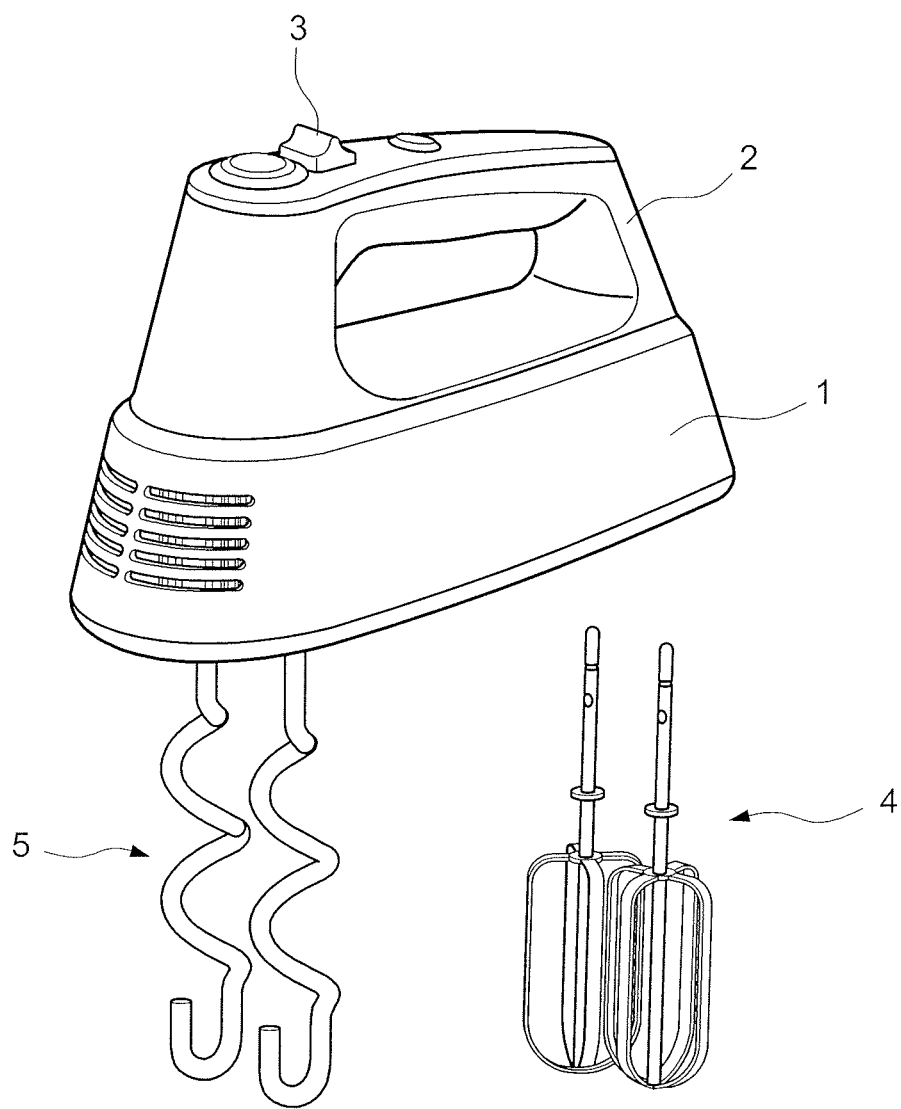
FIG. 1 is an isometric illustration of a hand mixer showing two different work tools.
Figure 2:
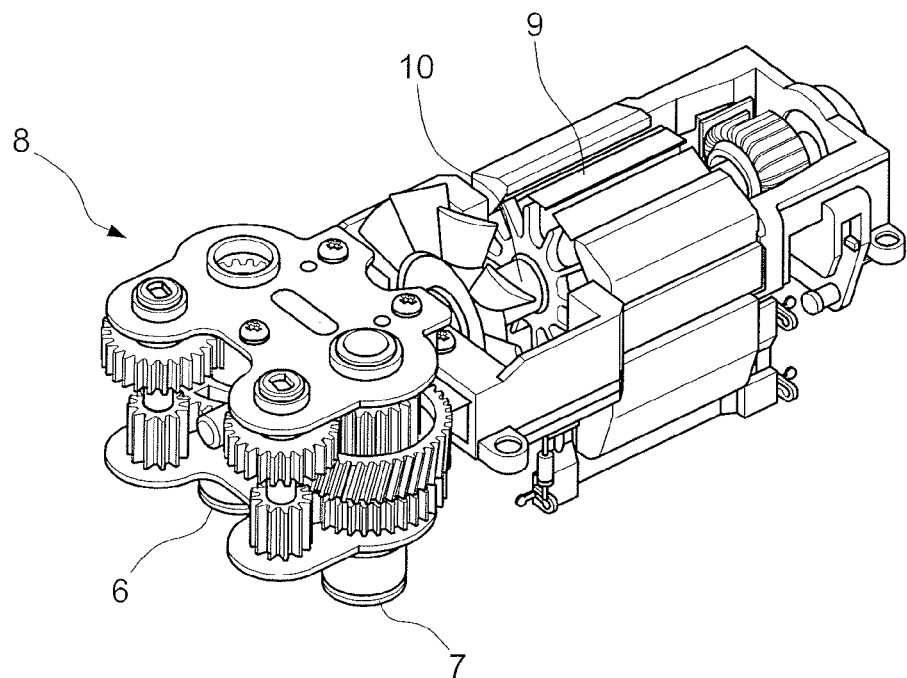
FIG. 2 is a perspective illustration of the internal motor and gear mechanism of the mixer.

The entire contents of US patent publication 2009-00911199-A1 dated Apr. 6, 2009 is incorporated herein by reference.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. In the following description a preferred example of the invention is described as practiced in an electric mixer, and in particular a handheld electric mixer. However, the invention is capable of being practiced in other types of household appliance including bench mixers, stick blender, juicer and larger industrial mixers.

In a hand-held electric mixer according to the invention the speed of rotation of the mixing tool, either a traditional beater or a dough hook, is dependent upon which tool is inserted into the output socket of the mixer. The mixer comprises dual concentric output spindles within the tool socket so that if a tool such as a traditional beater is inserted within the outlet socket it engages with a first spindle and turns to the first rotational speed. If a second tool such as a dough hook is inserted within the output socket, it engages with the second spindle which turns at a second speed. Thus the speed of the tool depends on the tool that is inserted into the outlet and the motor can be driven at a continuous speed.

Referring to the drawings there is shown a hand-held electric mixer having an elongate body portion 1 below an integrally formed handle portion 2. Located on a top part of handle portion 2 is a switch mechanism 3 that is operable by the thumb of a user in order to start and stop the mixer. The switch portion 3 may include variable speed positions for changing the speed of the mixer as it is known in the art. On the underside of the mixer body 1 is a pair of tool outlets or sockets 6, 7 which receive work tools such as beaters 4 or dough hooks 5. A motor 9 is located within the housing and has an output shaft 10 which drives the work tools 4, 5 within the outlets 6, 7 via a gear box 8.

Figure 3:
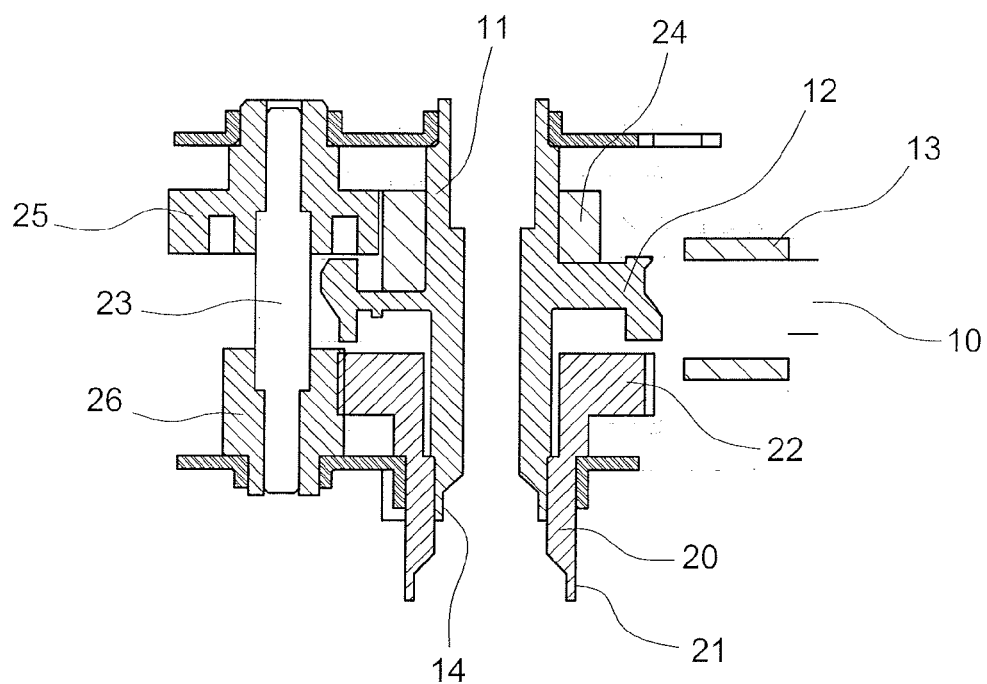
FIG. 3 is a section schematic illustration of the gear and output spindles of the mixer.
Figure 4:
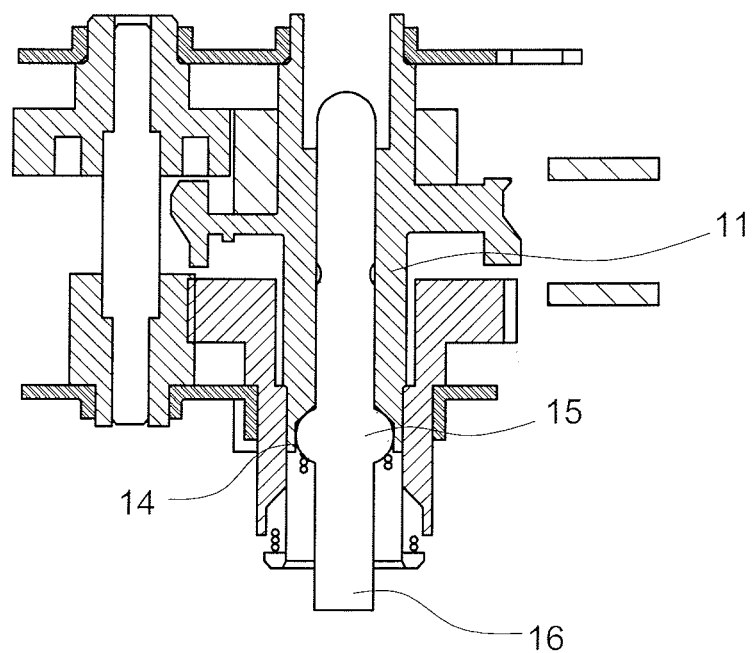
FIG. 4 is a section schematic illustration of the gear and output spindles with a first work tool inserted.
Figure 5:
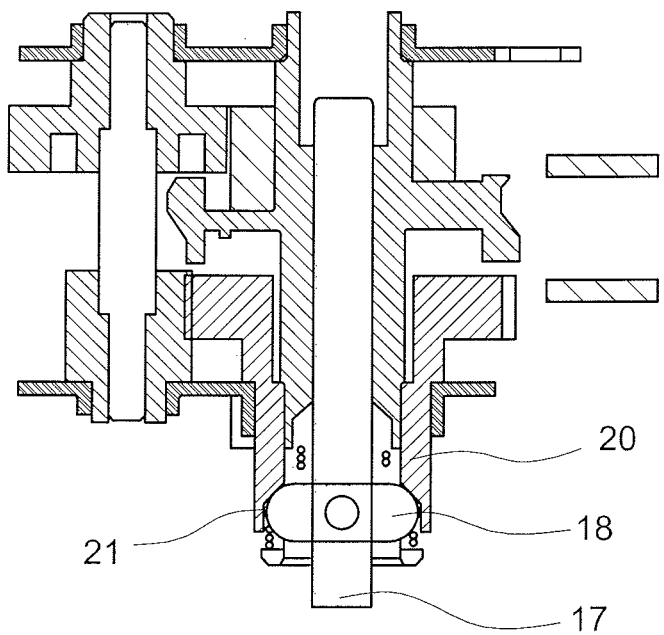
FIG. 5 is a schematic illustration of the gear and output spindles with a second work tool inserted.
Figure 6:
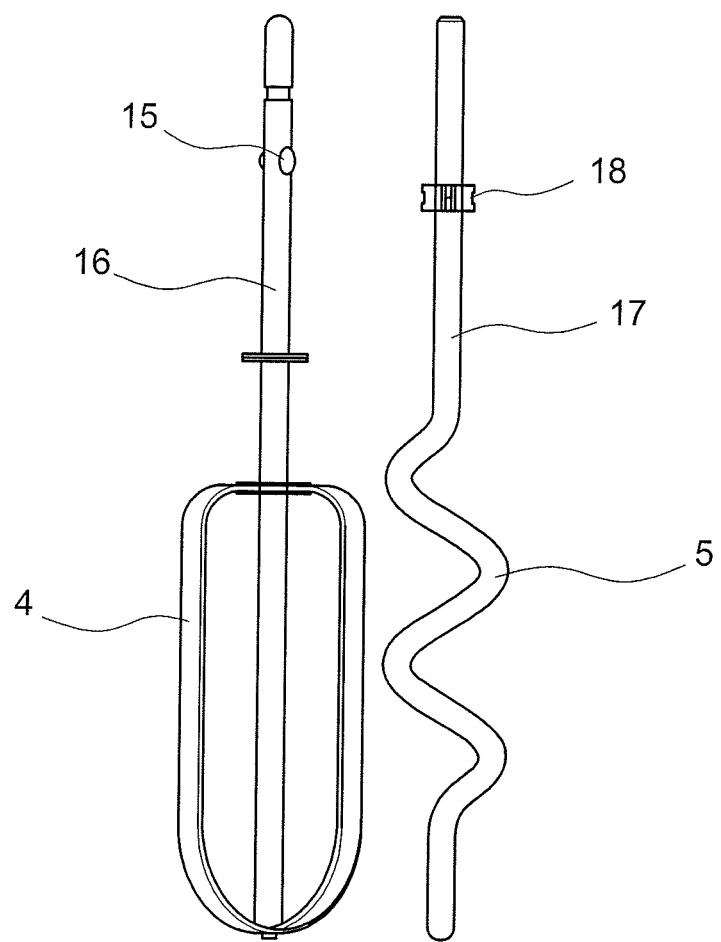
FIG. 6 is an illustration of the different work tools for use with the mixer.

FIG. 3 is a sectional schematic view through one of the tool outlets, for example outlet 7. Within the outlet socket 7 is a first rotationally mounted hollow tool spindle 11. The first tool spindle has a concentrically mounted external gear 12 which is driven from motor 9 by a worm gear 13 on the end of motor shaft 10. Rotation of the motor 9 causes rotation of the first outlet spindle 11. The lower end of the first spindle 11 is a coupling 14. A first work tool 4 comprises a shaft 16 having beating blades at its lower end and a pair of detents 15 at an upper end of the shaft. When the upper end of the tool shaft 16 is inserted within the socket outlet 7 the detents 15 engage with the coupling 14 in order to cause rotation of the tool 4 with rotation of the spindle 11. The coupling 14 and detent 15 arrangement may be of a type known in the art.

A second tool spindle 20 is concentrically arranged around the lower portion of first spindle 11. The two spindles 11, 20 are mounted to be independently rotatable at different rotational speeds. The second spindle 20 extends slight below the bottom of the first spindle 11 and has a second coupling 21. The diameter of second spindle 20 and second coupling 21 is larger than that of the first spindle 11 such that shaft 16 first tool 4 passes through second spindle 20 to engage first spindle 11 without touching second spindle 20. Because the second rotational output spindle is concentric with the first rotational output spindle the connection of one of the work tools to its respective spindle excludes connection of the other one of the work tools to its respective spindle, that is to say the first and second work tools cannot be connected to respective concentric spindles at the same time. Second spindle 20 has a concentric gear 22 located about the top part of the spindle 20.

A stub shaft 23 is located adjacent and parallel to the rotational axis of the first and second spindles. A pair of gears 25, 26 are mounted to the top and bottom of the stub shaft 23 respectively and are fixed thereto for rotation with the stub shaft. As second gear 24 located on and rotational with the first spindle 11 engages with the upper gear 25 of the stub shaft 23 in order to cause rotation of the stub shaft 23 when the first spindle 11 is driven by the motor 9. The second, lower, stub shaft gear 26 engages with gear 22 of the second spindle 20 in order to cause rotation of second spindle 20 when the stub shaft 23 rotates. By this gear arrangement rotation of motor 9 causes rotation of both the first spindle 11 and second spindle 20. Through the selection of different size gears 24, 25, 26 and 22 the second spindle 20 can be made to turn at a different rotational speed than the first spindle 11 for the same given motor speed. In the preferred embodiment the speed of spindle 20 is chosen to be one-third the speed of the first spindle 11—that is to say first spindle 11 turns three times faster that second spindle 20.

The second work tool 5 comprises a shaft 17 having blades or a beating/kneading hook arrangement as is known in the art. At the upper end of the shaft 17 is a pair of detents 18 having a larger diameter than the detents 15 of tool 4. When the second shaft 5 is inserted within an outlet of the mixer the larger diameter detents 18 engage with the second coupling 21 at the lower part of second spindle 20 and are caused to rotate with and at the same speed as second spindle 20. By the arrangement described if the first work tool 4 is inserted into the mixer tool outlets then first detents 15 on the first tool 4 engage with the coupling 14 of the first spindle and the tool 4 is rotated at the first rotational speed of the first spindle 11. If the second tool 5 is inserted within the same outlet of the mixer its second larger diameter detents 18 engage with the coupling 21 of the second output spindle 20 and the second tool 5 is caused to rotate at a different, slower, speed of the second spindle 20. In this way, the speed of the work tool depends upon the tool which is inserted into the outlet and the motor can be driven at the same speed. This provides a ratio reduction based on the type of tool being inserted into the mixer outlet without the need to physically or electronically change a speed ratio within the mixer itself. In the current instance first tool 4 is a beater which operates at a generally higher speed ratio than the second tool 5 which is a dough hook for kneading dough.

Because the couplings 14, 21 of the two outlet spindles 11, 20 are at different respective axial positions the corresponding detents 15 and 18 on respective tool shafts 16, 17 are also at different axial positions respective the upper or top end of the shafts 16, 17 such that the tools have the same extended lengths from the mixer. However, this is not essential to the invention as it may be desired for one tool to extend further from the mixer in order to have greater reach into the bottom of the bowl or the like.

The above described embodiment is a hand-held mixer however the invention is capable of application in other types of mixers including bench mixers and larger industrial mixers.

What is claimed is:

1. An electric appliance comprising:
    a first tool having a first shaft with first and second ends, a first operative element at the second end of the first shaft, and a first detent located on the first shaft between the first end of the first shaft and the first operative element, wherein the first detent extends outwardly from the first shaft and has a first outer dimension relative to the first shaft;
    a second tool having a second shaft with first and second ends, a second operative element at the second end of the second shaft, and a second detent located on the second shaft between the first end of the second shaft and the second operative element, wherein the second detent extends outwardly from the second shaft, has a second outer dimension relative to the second shaft, and the second outer dimensions is larger than the first outer dimension;
    a housing;
    an electric motor located within the housing;
    a tool socket located within the housing and accessible from outside the housing, wherein
        the tool socket includes first and second rotatable output spindles that are rotated by the electric motor,
        the first rotatable output spindle has a first coupling for releasably engaging the first detent of the first tool so that, when the first detent of the first tool is engaged with the first rotatable output spindle, the first tool is rotated by rotation of the first rotatable output spindle,
        the second rotatable output spindle has a second coupling for releasably engaging the second detent of the second tool so that, when the second detent of the second tool is engaged with the second rotatable output spindle, the second tool is rotated by rotation of the second rotatable output spindle,
        the first and second rotatable output spindles are concentric with each other,
        part of the first rotatable output spindle is located within the second rotatable output spindle,
        the outer dimension of the second detent is larger than an internal diameter of the first rotatable output spindle so that the first rotatable output spindle cannot engage the second tool,
        the outer dimension of the first detent is smaller than an internal diameter of the second rotatable output spindle so that the second rotatable output spindle cannot engage the first tool,
        engagement of the first tool with the first rotatable output spindle excludes engagement of any tool with the second rotatable output spindle, and
        engagement of the second tool with the second rotatable output spindle excludes engagement of any tool with the first rotatable output spindle; and
    a gear box located within the housing and mechanically coupling the electric motor to the first and second rotatable output spindles, wherein the gear box includes different, respective, gears engaging the first rotatable output spindle and the second rotatable output spindle so that the first and second rotatable output spindles are simultaneously rotated by the electric motor at different speeds, and the electric motor rotates the first or second tool, when engaged in one of the first and second rotatable output spindles, at a speed that depends on which of the first and second rotatable output spindles is engaged by the first or second tool.

2. The electric appliance of claim 1, wherein the gear box includes a stub-shaft that is spaced from and parallel to the first and second rotatable output spindles and first and second gears, and the first gear engages the first rotatable output spindle and the second gear engages the second rotatable output spindle, so that, when the electric motor rotates the first rotatable output spindle, the stub-shaft is driven by the first rotatable output spindle via the first gear, and the stub-shaft drives the second rotatable output spindle via the second gear.

3. The electric appliance of claim 2, wherein the first and second gears are different so that the first rotatable output spindle is rotated at a speed that is at least three times the speed at which the second rotatable output spindle is rotated.

4. The electric appliance of claim 1, wherein the electric appliance is a mixer, the first operative element is a beater, and the second operative element is a dough hook.

5. The electric appliance of claim 1, wherein the first detent is spaced a first distance from the first end of the first shaft, the second detent is spaced a second distance from the first end of the second shaft, and the second distance is larger than the first distance.

* * * * *